(12) United States Patent
Weisskopf et al.

(10) Patent No.: US 6,913,391 B2
(45) Date of Patent: Jul. 5, 2005

(54) BEARING FOR FIXING A STEERING SHAFT

(75) Inventors: Ulrike Weisskopf, Aurachtal (DE); Rainer Lutz, Markt Erlbach (DE); Jurgen Weiss, Leonberg (DE)

(73) Assignee: Ina-Schaeffler KG (DE)

( * ) Notice: Subject to any disclaimer, the term of this patent is extended or adjusted under 35 U.S.C. 154(b) by 104 days.

(21) Appl. No.: 10/447,574

(22) Filed: May 23, 2003

(65) Prior Publication Data

US 2005/0002593 A1 Jan. 6, 2005

Related U.S. Application Data

(63) Continuation of application No. PCT/EP01/11103, filed on Sep. 26, 2001.

(30) Foreign Application Priority Data

Nov. 24, 2000 (DE) .......................................... 100 58 491

(51) Int. Cl.[7] .............................................. F16C 19/08
(52) U.S. Cl. ........................ 384/536; 384/539; 384/903
(58) Field of Search ................................ 384/537, 903, 384/536, 539, 585, 582

(56) References Cited

U.S. PATENT DOCUMENTS

| 1,909,230 | A | 5/1933 | Smith |
| 5,085,548 | A | 2/1992 | Moyles |
| 5,462,369 | A | 10/1995 | Layne et al. |

FOREIGN PATENT DOCUMENTS

| DE | 2450580 | 4/1976 |
| DE | 2451531 | 5/1976 |
| DE | 3132443 | 2/1983 |
| DE | 3808556 | 9/1989 |
| DE | 4007941 | 9/1990 |
| DE | 4229199 | 3/1994 |
| DE | 19913211 | 9/2000 |
| DE | 19922914 | 11/2000 |
| DE | 69702541 | 3/2001 |
| GB | 417398 | 10/1934 |
| GB | 1019138 | 2/1966 |

Primary Examiner—Lenard A. Footland
(74) Attorney, Agent, or Firm—Charles A. Muserlian

(57) ABSTRACT

A bearing (3) for fixing a steering shaft (1) in a housing (4) is characterized in that the inner bearing ring (8) comprises, in at least one axial direction, an integrally formed cylindrical extension (11) adjoining the raceway (9), and the inner bearing ring (8) is pressed onto the steering shaft (1) with this cylindrical extension (11) which comprises through-holes (12) through which a locking ring (13) positively engages a groove (26) of the steering shaft (1).

5 Claims, 3 Drawing Sheets

BEARING FOR FIXING A STEERING SHAFT

This application is a Continuation of PCT/EP01/11103 filed Sept. 26, 2001.

FIELD OF THE INVENTION

The invention concerns a bearing for fixing a steering shaft in a housing, said bearing comprising at least one outer bearing ring, an inner bearing ring arranged on the steering shaft and rolling elements in rolling contact with associated raceways, the inner bearing ring being secured on the steering shaft against axial displacement in at least one direction.

Bearing arrangements of the pre-cited type serve to fix a steering shaft in a steering housing and are known in the most different of constructions. Thus, for example, at page 14 of the Technical Product Information: "Wälzlager und Komponenten für KFZ-Fahrwerke" issued by INA Wälzlager Schaeffler oHG, a steering shaft bearing arrangement is illustrated in which a ball bearing and a needle bearing spaced therefrom fix a steering shaft in a housing. These bearings must support the steering shaft without lash, effectively damp noises and vibrations, possess high rigidity and be as free of friction as possible. A further important requirement concerns safety. In case of a crash involving a head-on collision, the permissible path of displacement of the steering shaft into the passenger cell must lie within very narrow limits. This requires that the bearings be firmly anchored on the steering shaft and secured against axial displacement. The forces that have to be taken up in case of a crash are in the order of about 11,000 N. The upper bearing shown in FIG. 17 of the aforesaid Product Information is secured on the steering shaft against displacement in axial direction by two shoulders. These shoulders are constituted by two additional parts that are pressed onto the steering shaft and enclose the inner ring of the upper rolling bearing at both its front ends. This type of fixing of the bearing therefore requires a relatively large number of parts. Each individual part requires tools for its fabrication and for its mounting. The axial fixing of the bearing is therefore complicated and gives rise to high costs.

SUMMARY OF THE INVENTION

It is therefore an object of the invention to provide a bearing for fixing a steering shaft in a housing that is simpler to manufacture and easier to mount. Another object of the invention is provide a simple and effective axial securing of the bearing.

The invention achieves the above objects by the fact that the inner bearing ring comprises, in at least one axial direction, an integrally formed cylindrical extension adjoining the raceway, and the inner bearing ring is pressed onto the steering shaft with this cylindrical extension which comprises through-holes through which a locking ring positively engages a groove of the steering shaft.

By this combination of the inner bearing ring being pressed onto the steering shaft and the snapping-in of the locking ring into the groove of the steering shaft, the steering shaft is optimally secured against axial displacement so that it cannot penetrate into the passenger compartment in case of a crash. Handling and mounting of such a complete bearing assembly is likewise facilitated because the locking ring is snapped into the inner ring and is thus inseparably retained on the bearing during transportation till the time of being installed in place by the customer.

Further advantageous features of the invention are described.

The bearing is a lash-free four-point-contact ball bearing whose inner bearing ring is a non-machined part that comprises integrally formed cylindrical extensions adjoining the raceway in bath axial directions, and in the region of the raceway, the inner bearing ring has a clear diameter that is larger than the clear diameter of the cylindrical extensions. A particular advantage of this configuration of the bearing is that when the inner bearing ring is pressed onto the steering shaft, its raceway cannot be damaged because pressing-on is effected via the integrally formal cylindrical extensions.

The outer bearing ring may be composed of two ring parts that are spaced apart by a gap and form partial raceways, the ring parts are supported on elastic insert rings and are received in a bushing having radially inward oriented rims.

The configuration of the locking ring is described in mare detail according to which the locking ring is made of a spring steel and comprises a slot as also regions of different radial dimensions arranged in alternating sequence in peripheral direction, the regions having the smaller radial dimension engage the groove and the regions having the larger radial dimension are seated on the inner bearing ring. Due to this configuration, mounting is considerably facilitated because such a ring is simple to handle. It is possible to further control the force of displacement of the steering shaft in case of a crash by a proper choice of the peripheral dimension of the regions of smaller and the regions of larger diameter.

Finally, the locking ring may comprise at least three uniformly alternating successive regions of different radial dimensions.

The invention will now be described more closely with reference to one example of embodiment.

DETAILED DESCRIPTION OF THE DRAWINGS

Figure 1:
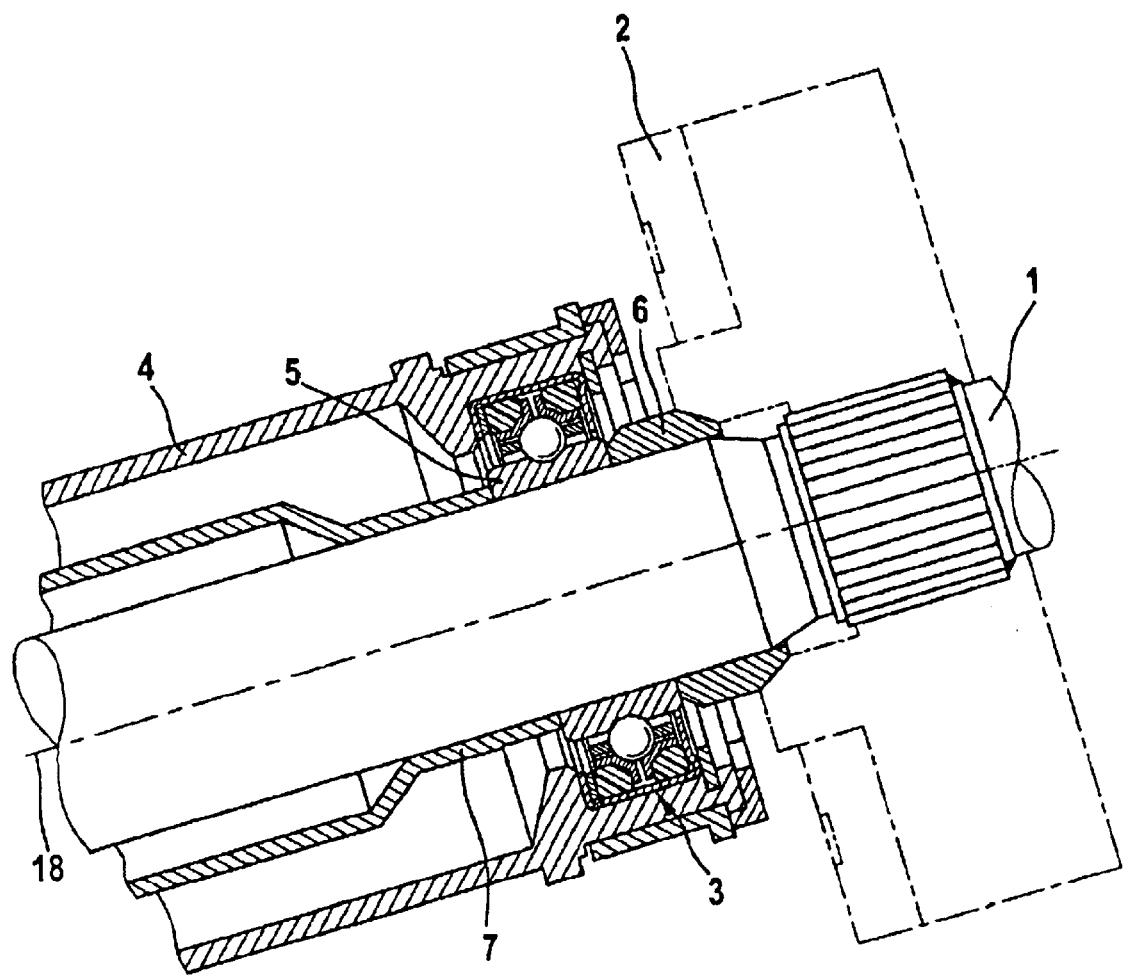
FIG. 1 shows a prior art mounting set-up of a steering shaft in the region of the steering wheel.
Figure 2:
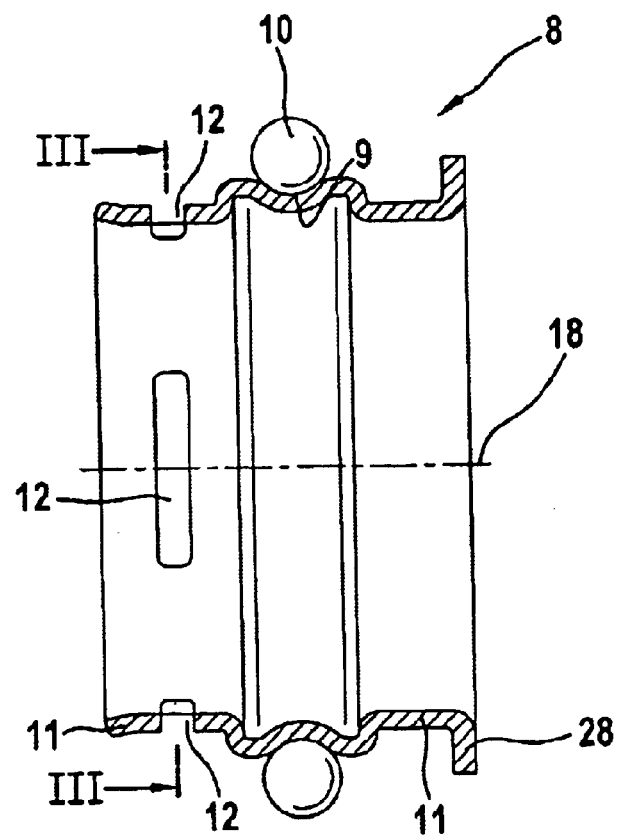
FIG. 2 is a longitudinal section through the inner ring of a steering shaft bearing according to the invention.
Figure 3:
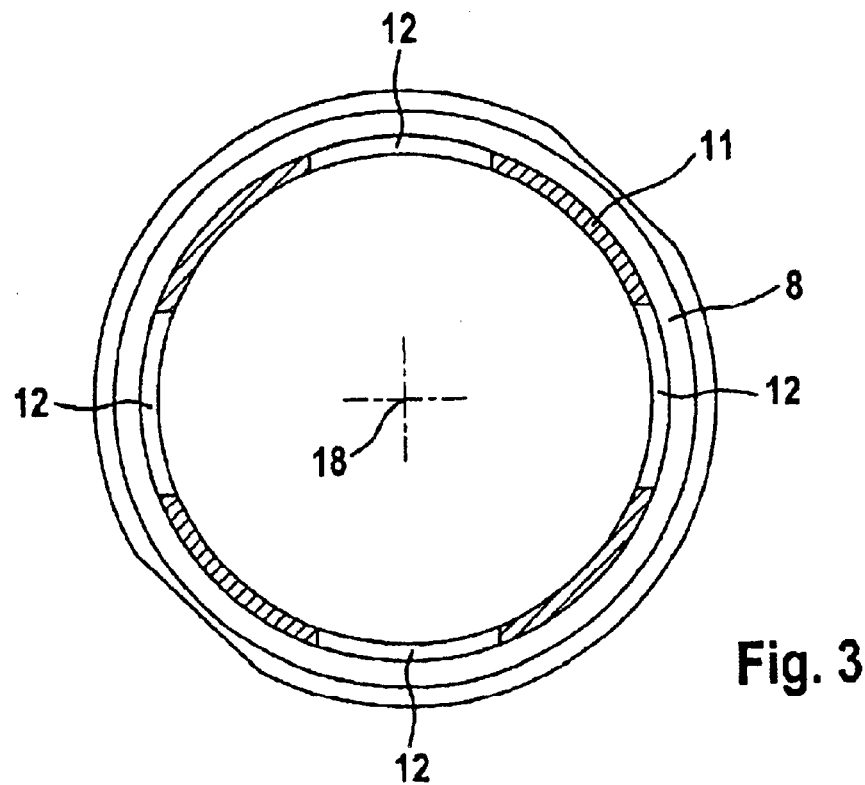
FIG. 3 is a cross-section along line III—III of FIG. 2.
Figure 4:
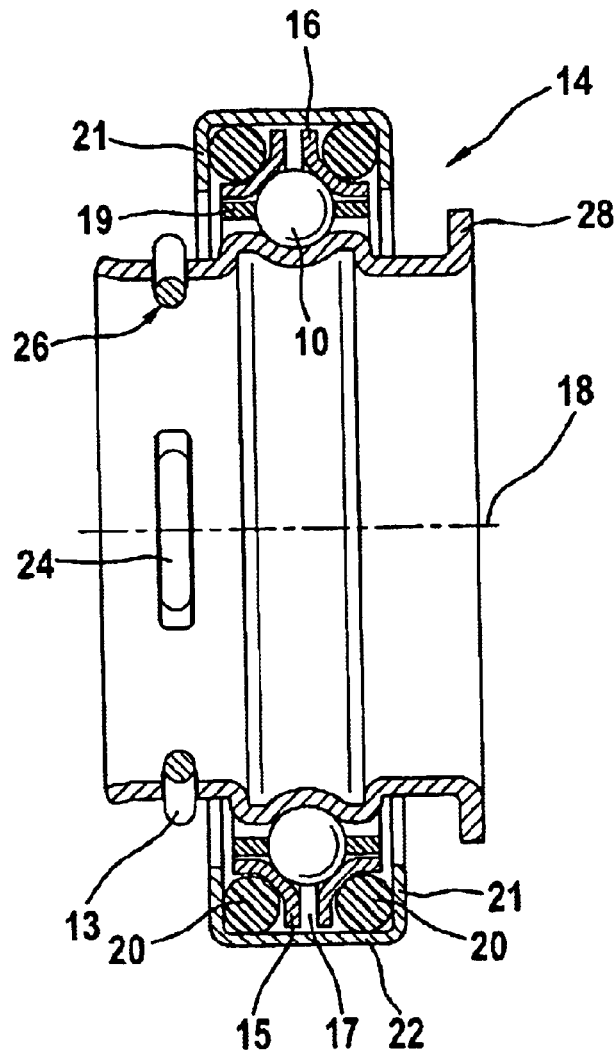
FIG. 4 is a longitudinal section through a complete bearing according to the invention.

According to the prior art, the steering shaft 1, that is rotatable about its axis 18 and connects the steering wheel 2 to a steering gear, is retained by two spaced-apart rolling bearings, only the upper bearing 3 being shown in FIG. 1. This bearing supports the steering shaft 1 in the housing 4, and the inner bearing ring 5 is secured against axial displacement on the steering shaft 1 by the parts 6 and 7. Whereas the part 6 is configured as a solid locking ring, the part 7 is designed as a sleeve whose diameter varies along its axial length. Both the part 6 and the part 7 are pressed onto the steering shaft 1 so as to firmly enclose the inner ring 5 of the bearing 3 on both its front ends. It is obvious that such an axial fixing of the bearing 3 on the steering shaft 1 through the additional parts 6 and 7 is very complicated and therefore expensive.

Figure 5:
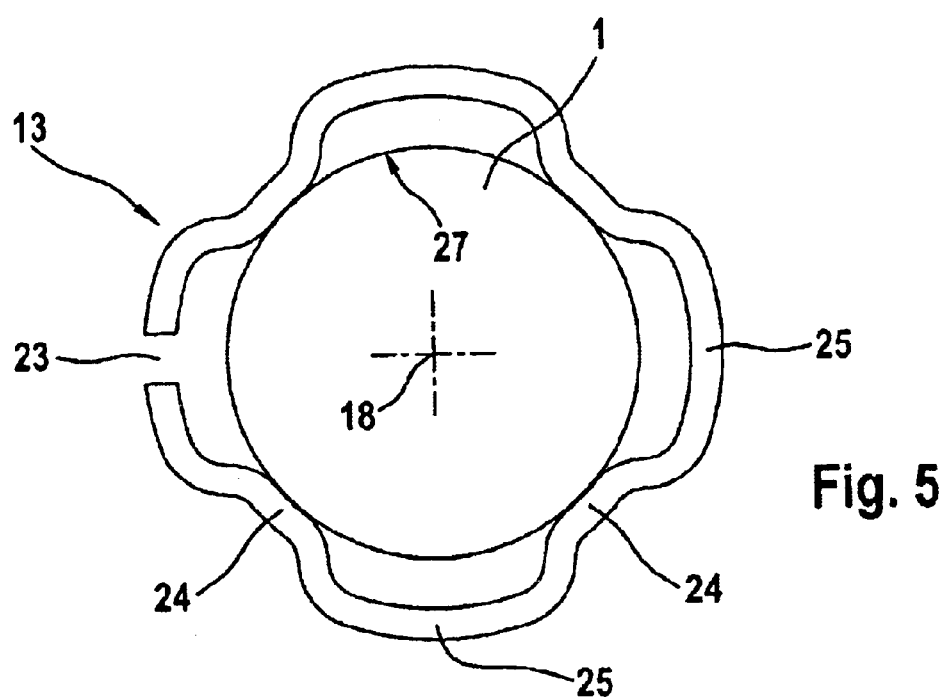
FIG. 5 is a top view of a locking ring.

The essentials of the invention are represented in FIGS. 2, 3, 4 and 5. It can be seen that the inner ring 8 of the bearing 3 having the flange 28 on the right is a non-machined component that comprises in both axial directions the integrally formed cylindrical extensions 11 adjoining the raceway 9 of the bearing balls 10. It can be seen further that the clear diameter of the cylindrical extensions 11 is smaller than the clear diameter of the inner bearing ring 8 in the region of the raceway 9. The inner bearing ring 8 is pressed onto the steering shaft 1, and, due to the different diameters, the interference fit is accomplished through the cylindrical extensions 11 which are deformed in the elastic region when pressed onto the steering shaft 1. Thus, a damaging of the raceway region 9 during pressing-on of the inner ring 8 is advantageously avoided. As can be seen further in the figures, the left-hand cylindrical extension 11 of the inner ring 8 comprises four equally spaced through-holes 12 into which the locking ring 13 shown in FIG. 5 is snapped. In this way, the inner bearing ring 8 is retained on the steering shaft 1 both by force and by positive engagement.

As already elaborated above, the essential part of the invention is the configuration of the inner bearing ring 8 and its fixing on the steering shaft 1. In contrast, the configuration of the rest of the bearing may differ. According to FIG. 4, the bearing is configured as a four-point-contact bearing 14 whose outer bearing ring is formed by two part rings 15, 16 that are spaced from each other in direction of the axis 18 by a gap 17. The bearing balls 10 guided in the cage 19 therefore possess two outer raceways, not referenced. The open side of each part ring 15, 16 receives an elastic insert ring 20, and the part rings 15, 16 are together surrounded by radially inward oriented rims 21 of the bushing 22, so that an inseparable assembly is formed. Other feasible configurations of the outer bearing ring suitable for use with the inner bearing ring of the invention can be seen, for example, in DE 40 03 052 A1, DE 41 14 643 C2, DE 42 29 199 A1 and DE 42 24 992 A1.

It can be discerned in FIG. 5 that, as seen in a top view, the locking ring 13 having the slot 23 deviates from the circular shape, i.e. it comprises alternating regions 24, 25 of different radial dimensions arranged behind one another in peripheral direction. Each of four regions 24 having a smaller radial dimension alternates with a region 25 of larger radial dimension. The regions 24 engage the groove 26 situated in the steering shaft 1, and due to the spring effect, these regions 24 bear firmly against the groove bottom 27. The radially larger regions 25 are seated on the outer peripheral surface of the inner bearing ring 8 in the region of the cylindrical extension 11. The peripheral dimension of the regions 24 can be chosen in a simple manner depending on the axial displacing force acting on the steering shaft 1. The larger the axial displacing force, the larger should also be the peripheral dimension of the regions 24.

Reference Numerals

1 Steering shaft
2 Steering wheel
3 Bearing
4 Housing
5 Inner bearing ring
6 Part
7 Part
8 Inner bearing ring
9 Raceway
10 Rolling element
11 Cylindrical extension
12 Through-hole
13 Locking ring
14 Four-point-contact bearing
15 Ring part
16 Ring part
17 Gap
18 Axis
19 Cage
20 Insert ring
21 Rim
22 Bushing
23 Slot
24 Region
25 Region
26 Groove
27 Groove bottom
28 Flange

What is claimed is:

1. A bearing (3) for fixing a steering shaft (1) in a housing (4), said bearing comprising at least one outer bearing ring, an inner bearing ring arranged on the steering shaft and rolling elements (10) in rolling contact with associated raceways (9), the inner bearing ring being secured on the steering shaft (1) against axial displacement in at least one direction, characterized in that, the inner bearing ring (8) comprises, in at least one axial direction, an integrally formed cylindrical extension (11) adjoining the raceway (9), and the inner bearing ring (8) is pressed onto the steering shaft (1) with this cylindrical extension (11) which comprises through-holes (12) through which a locking ring (13) positively engages a groove (26) of the steering shaft (1).

2. A bearing (3) according to claim 1, characterized in that it is configured as a lash-free four-point-contact bearing (14) whose inner bearing ring (8) is a non-machined part that comprises integrally formed cylindrical extensions (11) adjoining the raceway (9) in both axial directions, and in the region of the raceway (9), the inner bearing ring (8) has a clear diameter that is larger than the clear diameter of the cylindrical extensions (11).

3. A bearing (3) according to claim 2, characterized in that the outer bearing ring is composed of two ring parts (15, 16) that are spaced apart by a gap (17) and form partial raceways, the ring parts (15, 16) are supported on elastic insert rings (20) and are received in a bushing (22) having radially inward oriented rims (21).

4. A bearing (3) according to claim 1, characterized in that the locking ring (13) is made of a spring steel and comprises a slot (23) as also regions (24, 25) of different radial dimensions that are arranged in alternating sequence in peripheral direction, the regions (24) of smaller radial dimension engage the groove (26) and the regions (25) of larger radial dimension are seated on the inner bearing ring (8).

5. A bearing (3) according to claim 4, characterized in that the locking ring (13) comprises at least three uniformly alternating successive regions (24, 25) of different radial dimensions.

* * * * *